United States Patent [19]

Norman

[11] 4,435,914
[45] Mar. 13, 1984

[54] FISH LURE

[75] Inventor: Bill K. Norman, Greenwood, Ark.

[73] Assignee: Norman Manufacturing Co., Inc., Greenwood, Ark.

[21] Appl. No.: 297,348

[22] Filed: Aug. 28, 1981

[51] Int. Cl.³ ............................................. A01K 85/00
[52] U.S. Cl. .................................. 43/42.12; 43/42.16; 43/42.19; 43/42.28; 43/42.31
[58] Field of Search ................. 43/42.12, 42.16, 42.19, 43/42.28, 42.31, 42.41

[56] References Cited

U.S. PATENT DOCUMENTS

| | | | |
|---|---|---|---|
| 2,517,495 | 8/1950 | Kneece | 43/42.12 |
| 2,571,980 | 10/1951 | Weigandt | 43/42.16 |
| 2,630,649 | 3/1953 | Arbogast | 43/42.12 |
| 2,819,553 | 1/1958 | Fultz | 43/42.12 |
| 3,133,373 | 5/1964 | Jeffers | 43/42.41 |
| 3,405,475 | 10/1968 | Ross | 43/42.41 |
| 3,728,811 | 4/1973 | Weimer | 43/42.12 |

FOREIGN PATENT DOCUMENTS 87792  6/1956  Norway ............................. 43/42.12

Primary Examiner—Nicholas P. Godici
Assistant Examiner—Kurt Rowan
Attorney, Agent, or Firm—Harvey B. Jacobson

[57] ABSTRACT

An elongated generally flat body is provided and is slightly elongated egg-shaped in plan including small and large radius front and rear ends. The front end of the body includes structure for attaching a free end of a fishing line thereto and the body includes upper and lower sides. A central upstanding opening is formed through the body and a spinner is journaled in the opening. A forwardly opening hook is anchored relative to and is trailed behind the rear large radius end of the body and the lower side of the body is both longitudinally and transversely convex. Also, the portion of the lower side of the body defining the rear marginal portion of the opening is disposed at a level slightly below the marginal portion of the lower side of the body defining the forward margin of the opening. The spinner is generally S-shaped in axial elevation and is journaled for rotation about a horizontal axis extending transversely of the body.

3 Claims, 6 Drawing Figures

FISH LURE

BACKGROUND OF THE INVENTION

Various forms of surface retrieve or trolling fishing lures heretofore have been provided, but many of these lures are not constructed in a manner whereby they may be retrieved or trolled while moving in a straight path and under surface retrieve and trolling lures are not constructed in a manner whereby they are self-righting immediately upon retrieve if the retrieve is begun while the lure is below the surface of the body of water being fished.

Accordingly, a need exists for an improved surface retrieve or trolling lure which may be retrieved or trolled in a substantially straight path and which will be self-righting.

BRIEF DESCRIPTION OF THE INVENTION

The lure of the instant invention has been constructed to provide a fishing lure which may be surface retrieved or trolled in a straight path and with the lure always in an upright position. The lure includes a body constructed of plastic and which is generally flat and slightly elongated, egg-shaped in plan. The upperside of the body is generally flat and the underside of the body is both transversely and longitudinally convex, at least to a slight degree. A central upstanding opening is formed through the body and has an S-shaped spinner journaled therein for rotation about a horizontal transverse axis. The rear lower marginal portion of the opening is disposed slightly lower than the forward lower marginal portion of the opening and, accordingly, during retrieve or trolling functions of the lure, the lower rear marginal portion of the opening drags in the water and upwardly scoops water through the opening to create a splashing motion and to facilitate spinning of the spinner. The rear of the lure is equipped with an upwardly offset skirted hook constructed in a manner whereby only the skirt may be seen by a fish below the surface of the water. In this manner, a wary fish is not scared away by the appearance of a hook and is attracted only to the surface splashing and movement of the lure.

The main object of this invention is to provide a fishing lure which may be surface retrieved or trolled in a substantially straight path.

Another object of this invention is to provide a lure of the surface retrieve or trolling type and constructed in a manner whereby forward movement of the lure through the water will create a splashing action.

Still another important object of this invention is to provide a lure equipped with a spinner which, together with the aforementioned splashing action, will greatly attract fish to the lure.

A further object of this invention is to provide the lure with an upwardly displaced hook which is maintained above the surface of the water and a hook which is skirted so as to prevent the hook from being seen by a fish below the surface of the water.

A final object of this invention to be specifically enumerated herein is to provide a fishing lure in accordance with the preceding objects and which will conform to conventional forms of manufacture, be of simple construction and easy to use, so as to provide a device that will be economically feasible, long lasting and relatively trouble-free in operation. These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE INVENTION

Figure 1:
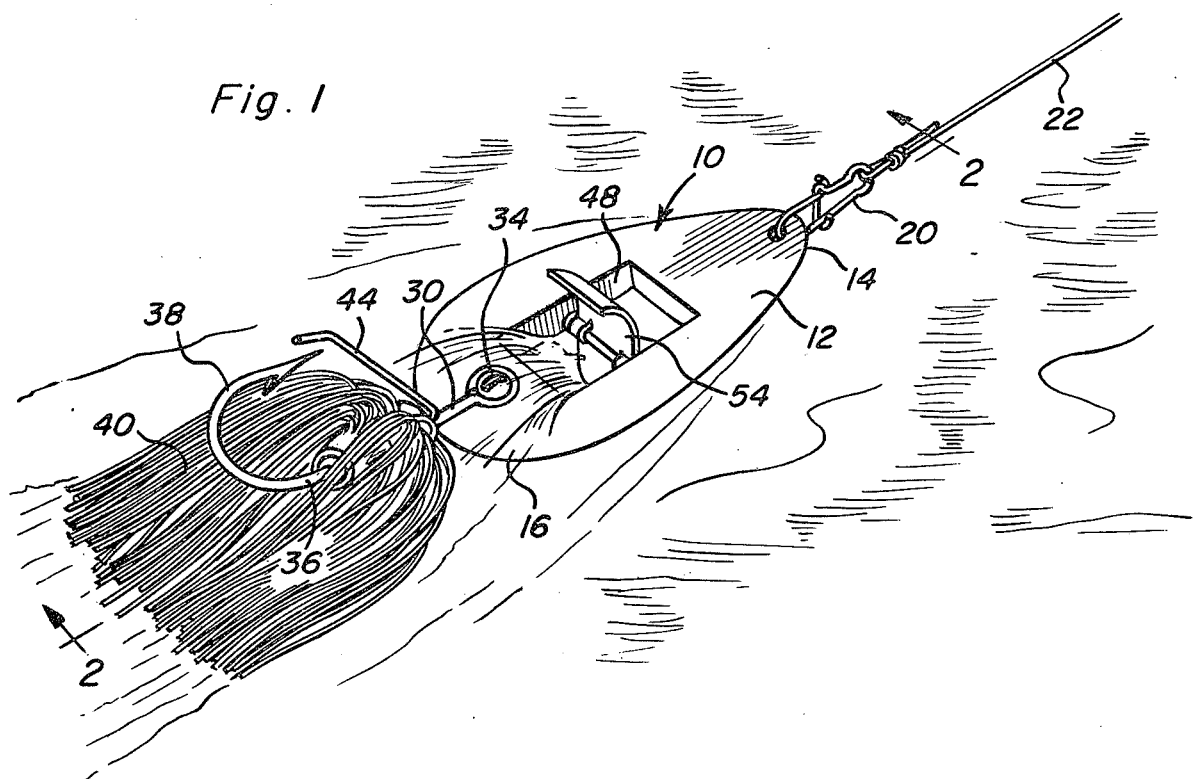
FIG. 1 is a perspective view of the lure of the instant invention during a surface retrieve mode.

Referring now more specifically to the drawings, the numeral 10 generally designates the lure of the instant invention. The lure 10 includes an elongated body 12 which is generally slightly elongated egg-shaped in plan. The body 12 includes a forward small radius end 14 and a rear large radius end 16. The forward end 14 includes a vertical bore 18 formed therethrough for receiving a releasable attaching hook 20 therethrough carried by the free end of the fishing line 22. The rear end of the body 12 includes a threaded bore 24 formed vertically therethrough and the upper end of the bore 24 opens upwardly into a keyhole slot 26 formed in the upper surface 28 of the body 12. The free downwardly offset eye equipped terminal end 30 of a fishhook shank 32 is received in the slot 26 and a threaded fastener 34 is secured downwardly through the eye and threadedly engaged in the bore 24. The hook end 36 of the fishhook shank is upwardly offset relative to the terminal end 30 and includes a reversely bent and barbed hook 38 supported therefrom. A rubber material skirt assembly 40 is supported from the fishhook shank 32 by a lead body 42 supported therefrom and a weed diverting spring arm 44 is carried by the body 42 and renders the hook 38 of the "weedless" type.

Figure 2:
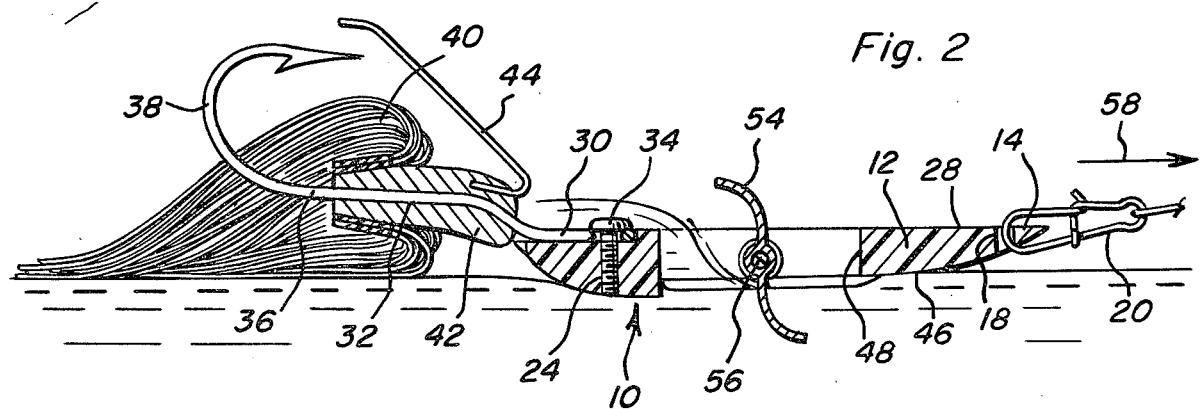
FIG. 2 is an enlarged longitudinal vertical sectional view taken substantially upon the plane indicated by the section line 2—2 of FIG. 1.
Figure 3:
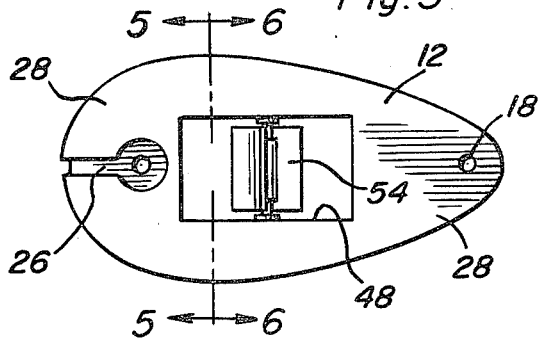
FIG. 3 is a top plan view of the lure with the skirted hook thereof removed.
Figure 4:
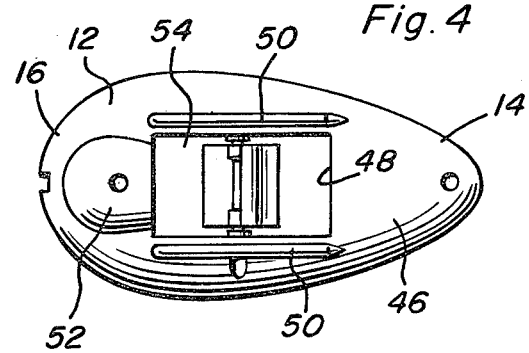
FIG. 4 is a bottom plan view of the lure with the skirted hook removed.
Figure 5:
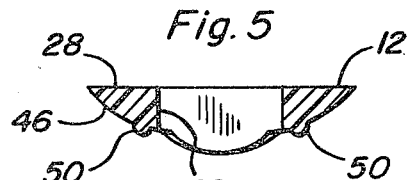
FIG. 5 is a vertical transverse sectional view taken substantially upon the plane indicated by the section line 5—5 of FIG. 3.
Figure 6:
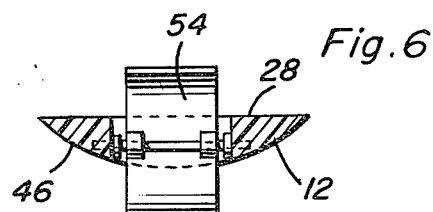
FIG. 6 is a vertical transverse sectional view taken substantially upon the plane indicated by the section line 6—6 of FIG. 3.

The body 12 includes an under or lower surface 46 and the undersurface 46 is both transversely and longitudinally slightly downwardly convex whereby the body 12 may plane over the surface of the water in the manner illustrated in FIG. 2 of the drawings. The central portion of the body 12 has an upstanding opening 48 including a rear transverse upstanding wall 48 formed therethrough and the body 12 includes a pair of slightly downwardly projecting and longitudinally extending runners 50 molded therein on opposite sides of the opening. In addition, the portion of the body 12 defining the lower rear marginal portion opening 48 includes a slight downward projection 52 whereby the lower marginal edge of the opening 48 at the rear side thereof is lower than the lower marginal portion of the opening 48 at the forward side thereof.

A spinner 54 which is generally S-shaped in axial elevation is journaled in the opening 48 by an axle pin 56 extending transversely of the opening 48 centrally intermediate the front and rear ends thereof. The S-shaped spinner 54 is constructed in a manner whereby forward movement of the lure 10 over the water in the direction of the arrow 58 in FIG. 2 will cause the spinner 54 to rotate in a clockwise direction. In addition, as the lure 10 moves in the direction of the arrow 58, the lower rear marginal portion of the opening 48 acts as a scoop and scoops a portion of the water upwardly through the opening 48 to cause a splashing action immediately rearward of the body 12 and in the area of the skirt assembly 40. The spinning of the spinner 54 and the splashing of water in the area of the skirt assembly 40 act to attract fish to the lure. Further, the skirt assembly 40 immediately underlies the reversely bent hook 38 and therefore shields the latter from view by a fish below the surface of the water.

Because of the forward and upward pull on a lure as it is surface trolled or retrieved after a cast, the upwardly displaced hook 38 and skirt assembly 40, in conjunction with the transversely and longitudinally downwardly convex or undersurface 46 of the body 12, serves to immediately return the lure 10 to an upright position from an inverted position upon initial retrieve or troll. Accordingly, the lure 10 will soon break the surface of the water and skim thereover in the aforementioned manner to attract fish.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A surface retrieve or trolling lure comprising an elongated generally planar body being slightly elongated, egg-shaped in plan including small and large radius front and rear ends, said front end including means for attaching the free end of a fishing line thereto, said body including upper and lower sides and a central upstanding opening formed therethrough including a rear upstanding transverse wall, a spinner journaled in said opening, forwardly opening hook means anchored relative to and trailed behind the large radius end of said body, said lower side being both longitudinally and transversely downwardly convexed substantially throughout the plan area thereof, the portion of said lower side defining the rear marginal edge of said opening including a transversely rounded downward projection terminating downwardly at a level slightly below the portion of said lower side defining the forward marginal portion of the opening, the lower margin of said rear transverse wall defining the forward extremity of said projection, said spinner being generally S-shaped in axial elevation and being journaled for rotation about a horizontal axis extending transversely of said body, said rear marginal edge defining the lower extremity of said rear transverse wall, the upper surface of said body being generally flat and horizontal, said upper surface and said rear transverse wall being devoid of inclined portions thereof operative, responsive to said body being forwardly advanced over the surface of a body of water, to cause water incident thereupon to develop a downward reaction force on said body sufficient to overcome the inherent planing effect developed on the body as a result of the downwardly convex lower side of said body moving over the surface of a body of water, said hook means including an elongated shank terminating at one end in a reverse turned hook portion, the other end of said shank being anchored to said body with said one shank end projecting rearwardly of said body.

2. The fish lure of claim 1 wherein said one end of said shank is upwardly offset relative to the other end thereof.

3. The fish lure of claim 2 wherein said one end of said shank is skirted.

* * * * *